United States Patent
Looi et al.

(10) Patent No.: US 7,376,775 B2
(45) Date of Patent: May 20, 2008

(54) APPARATUS, SYSTEM, AND METHOD TO ENABLE TRANSPARENT MEMORY HOT PLUG/REMOVE

(75) Inventors: Lily Pao Looi, Portland, OR (US); Stanley Steven Kulick, Portland, OR (US); Dean A Mulla, Saratoga, CA (US); Ashish Gupta, San Jose, CA (US); Keith R. Pflederer, San Jose, CA (US); Shivnandan D. Kaushik, Portland, OR (US); Mohan J. Kumar, Aloha, OR (US); James B. Crossland, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 612 days.

(21) Appl. No.: 10/749,929

(22) Filed: Dec. 29, 2003

(65) Prior Publication Data

US 2005/0149314 A1    Jul. 7, 2005

(51) Int. Cl.
*G06F 13/00* (2006.01)

(52) U.S. Cl. ............... 710/300; 710/311; 710/312

(58) Field of Classification Search ........ 710/300–317, 710/8–19, 260–269
See application file for complete search history.

(56) References Cited

U.S. PATENT DOCUMENTS

| 6,070,207 | A  | * | 5/2000  | Bell ........................... 710/302 |
| 6,574,695 | B1 | * | 6/2003  | Mott et al. ................... 710/302 |
| 6,823,418 | B2 | * | 11/2004 | Langendorf et al. ........ 710/306 |
| 7,000,042 | B1 | * | 2/2006  | Burns et al. ................. 710/104 |
| 7,165,136 | B2 | * | 1/2007  | Dennis et al. ............... 710/305 |

* cited by examiner

*Primary Examiner*—Raymond N Phan
(74) *Attorney, Agent, or Firm*—Schwegman, Lundberg & Woessner, P.A.

(57) ABSTRACT

In some embodiments, an apparatus includes a processor, an expander memory bridge location, a memory coupled to the expander memory bridge location, and a bus controller including intercept logic to intercept and block communication from the processor to the expander memory bridge location and to emulate an expander memory bridge. In some embodiments, a method includes intercepting and blocking a status request to a device, regardless of whether the device is installed, and responding to the status request.

24 Claims, 5 Drawing Sheets

APPARATUS, SYSTEM, AND METHOD TO ENABLE TRANSPARENT MEMORY HOT PLUG/REMOVE

Field

This invention relates to computer systems and, more particularly, to device emulation in computer systems.

Background

Some computer systems include an operating system that recognizes particular devices, such as disk drives, as hot-pluggable. A hot-pluggable device is a device that can be removed from a computer system or added to a computer system, while the computer system is operating, without interfering with the operation of the computer system. Being able to remove or add devices in a computer system, while the computer system is operating, allows the computer system to operate efficiently. For example, in a computer system that recognizes hot-pluggable devices, the computer system can continue to do work while the hot-pluggable devices are removed for maintenance or added. Unfortunately, not all computer systems include operating systems that recognize all devices as hot-pluggable devices. In these computer systems, removing or adding devices that are not recognized as hot-pluggable devices interferes with the efficient operation of the computer system. For example, some computer systems include expander memory bridges (to couple processors to memory) and an operating system that does not recognize the expander memory bridges as hot-pluggable. In these computer systems, removing or adding an expander memory bridge causes the operating system to identify an error condition. Identification of an error condition along with execution of any associated error routines interferes with the efficient operation of the computer system.

Description

Figure 1:
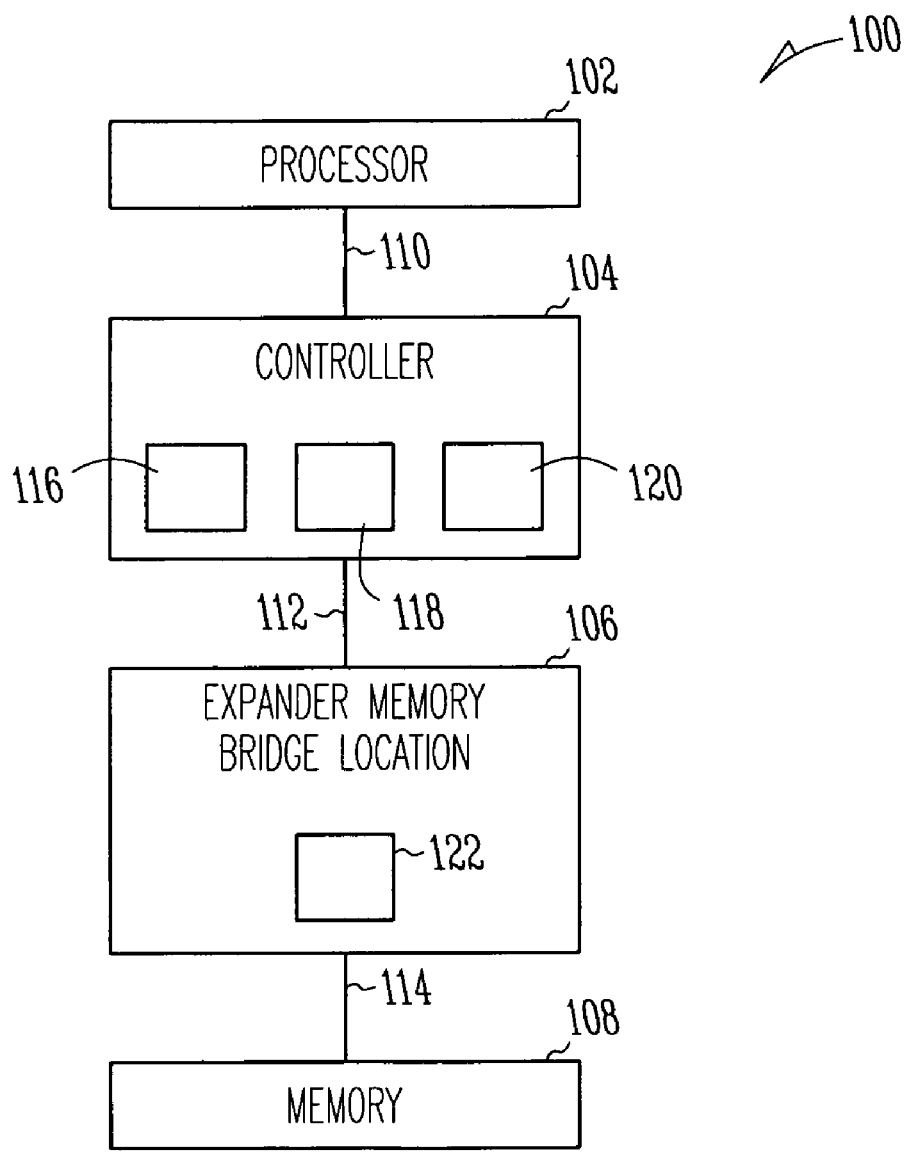
FIG. 1 is a block diagram of an apparatus including a processor, an expander memory bridge location, a memory, and a controller in accordance with some embodiments of the present invention.

In the following description of some embodiments of the present invention, reference is made to the accompanying drawings which form a part hereof, and in which are shown, by way of illustration, specific embodiments of the present invention which may be practiced. In the drawings, like numerals describe substantially similar components throughout the several views. These embodiments are described in sufficient detail to enable those skilled in the art to practice the present invention. Other embodiments may be utilized and structural, logical, and electrical changes may be made without departing from the scope of the present invention. The following detailed description is not to be taken in a limiting sense, and the scope of the present invention is defined only by the appended claims, along with the full scope of equivalents to which such claims are entitled.

FIG. 1 is a block diagram of an apparatus 100 including a processor 102, a controller 104, an expander memory bridge location 106, and a memory 108 in accordance with some embodiments of the present invention. The processor 102 is coupled to the controller 104 through a signal path 110. The signal path 110 provides a communication channel between the processor 102 and the controller 104. The controller 104 is coupled to the expander memory bridge location 106 through a signal path 112. The signal path 112 provides a communication channel between the controller 104 and the expander memory bridge location 106. The expander memory bridge location 106 is coupled to the memory 108 through a signal path 114. The signal path 114 provides a communication channel between the expander memory bridge location 106 and the memory 108.

The processor 102 is a programmable device that can store, retrieve, and process information. The processor 102 is not limited to a particular type of processor. Exemplary processors suitable for use in connection with the apparatus 100 include complex instruction set processors, reduced instruction set processors, digital signal processors, and very long instruction word processors.

The controller 104 is a device that processes information transmitted between the processor 102 and the expander memory bridge location 106. The controller 104 includes intercept logic 116, an expander memory bridge plugged-in bit 118, and a disable intercept logic bit 120. The intercept logic 116 includes logic gates (not shown), including but not limited to AND gates, NAND gates, OR gates, NOR gates, INVERTER gates, and EXCLUSIVE-OR gates, organized to identify configuration accesses directed to the expander memory bridge location 106.

The expander memory bridge plugged-in bit 118 includes a storage location, such as a register, a flip-flop, or a memory cell, such as a flash memory cell, to indicate whether an expander memory bridge 122 is plugged-in (installed) or not plugged-in (not installed). The expander memory bridge plugged-in bit 118 includes a set state (active) and a reset state (inactive). The expander memory bridge plugged-in bit 118 is set to indicate that the expander memory bridge 122 is plugged-in. The expander memory bridge plugged-in bit 118 is reset to indicate that the expander memory bridge 122 is not plugged-in. The expander memory bridge plugged-in bit 118 provides information useful when adding and removing the expander memory bridge 122 in the apparatus 100. For example, if the memory 108 associated with the expander memory bridge 122 fails, then the status (installed or not installed) of the carrier (not shown) for expander memory bridge 122 is available to the processor 102 from the controller 104.

The disable intercept logic bit 120 includes a storage location, such as a register, a flip-flop, or a memory cell such as a flash memory cell, to indicate whether the intercept logic 116 is disabled. The disable intercept logic bit 120 includes a set state and a reset state. The disable intercept logic 120 bit is set to indicate that the intercept logic 116 is disabled. When the intercept logic 116 is disabled, the controller 104 does not intercept and block communications sent to the expander memory bridge locations 106. For example, the disable intercept logic bit 120 is set (the intercept logic 116 is disabled) to allow the processor 102 to read information, such as a die version number (which identifies a particular revision level of a die), at boot time. The disable intercept logic bit 120 is reset to indicate that the intercept logic 116 is enabled. When the intercept logic 116 is enabled, the controller 104 intercepts and blocks communications sent to the expander memory bridge location 106.

The expander memory bridge location 106 provides a location for connecting, coupling, or installing the expander memory bridge 122. The expander memory bridge 122 provides an interface between the controller 104 and the memory 108. The expander memory bridge 122 provides the controller 104 and the processor 102 with access to more memory than provided without the expander memory bridge 122. In some embodiments, the expander memory bridge 122 examines information exchanged between the processor 102 and the memory 108 to determine whether the information is free of errors. In some embodiments, the expander memory bridge 122 corrects errors in the information, logs errors detected in the information, and detects slow degradation of the memory 108.

The memory 108 includes an information storage device. The memory 108 is not limited to a particular type of information storage device. Exemplary information storage devices suitable for use in connection with the apparatus 100 include semiconductor memory storage devices, such as random access memory devices, including dynamic random access memory devices and static random access memory devices, double data rate dynamic random access memory devices, and flash memory devices. Exemplary storage devices suitable for use in connection with the apparatus 100 also include magnetic storage devices, such as magnetic random access memory devices.

The signal paths 110, 112, and 114 provide communication channels in the apparatus 100. The signal paths 10, 112, and 114 are not limited to a particular type of communication channel. In some embodiments, the signal paths 110, 112, and 114 include a communication channel that provides an electrically conductive communication channel, such as a signal bus. A signal bus includes a set of substantially parallel conductors that forms an information transmission path. A signal bus can be formed from a electrically conductive materials, such as copper, copper alloys, aluminum, aluminum alloys, or polysilicon. In some embodiments, the signal paths 110, 112, and 114 include an optical communication channel formed from one or more optical fibers, such as glass fibers. In some embodiments, the signal paths 110, 112, and 114 include a free space channel that provides a radio frequency communication channel. The radio frequency communication channel is not limited to a particular frequency range.

In operation, the controller 104 receives communications from the processor 102. Exemplary communications include communications directed to memory space, input/output space, and configuration space. Communications directed to memory space include communications to write information to the memory space or read information from the memory space. Communications directed to input/output space include read and write communications directed to input/output devices, such as disk drives. Communications directed to configuration space include communications directed to a well-defined address space. For example, in some computer systems, configuration space includes addresses having an offset of 40X (hex) or less. Configuration space can include registers associated with the addresses in configuration space. For example, some chipsets include registers in configuration space that receive configuration information from the processor 102 and registers in configuration space that provide information to the processor 102. Exemplary information received from the processor 102 includes data rate information and protocol information. Exemplary information provided to the processor 102 includes information such as a die version number (which identifies a particular revision level of a die). The processor 102 polls configuration space to identify the devices installed in configuration space. Communications directed to configuration space can occur at boot time, but communications directed to configuration space are not limited to boot time.

In operation, the intercept logic 116 examines all communications from the processor 102 and determines the destination—memory space, input/output space or configuration space—of each communication. The intercept logic 116 only blocks communications directed to the configuration space. For example, the expander memory bridge 122 has an address in configuration space, so the intercept logic 116 blocks communications directed to the expander memory bridge 122. Again, communications directed to memory space and input/output space are not blocked. When a communication is intercepted and blocked, the communication is never seen by the registers associated with the addressed configuration space. For example, after receiving a configuration communication directed to the expander memory bridge 122 at the expander memory bridge location 106, the controller 104 responds to the processor 102 that the expander memory bridge 122 is installed, even if the expander memory bridge 122 is not installed. Thus, the controller 104, including the intercept logic 116, emulates the expander memory bridge 122.

In operation, the controller 104 supports memory mirroring. In memory mirroring, information is stored in two or more memories, so at least two images of the information are stored. Memory mirroring improves reliability in a computer system. For example, if information is stored in a first memory and a second memory and the first memory fails, then the information is still available from the second memory. Memory mirroring in the apparatus 100 makes memory failure substantially transparent to the processor 102. Information is not lost if one memory of the mirrored pair fails, and system operation continues while the failed memory is being replaced because configuration communications are intercepted and blocked at the controller 104.

In operation, the controller 104 supports information storage in a redundant array of independent memories. In some embodiments of a redundant array of independent memories, information is stored in four memories. Each of the four memories is coupled to one expander memory bridge. Storing information in a redundant array of independent memories improves reliability in a computer system. For example, in some embodiments, data is striped across the four memories and the striped data includes rotating parity. If one of the four memories fails, the information is recoverable from the other three memories. The use of a redundant array of independent memories in the apparatus 100 makes memory failure substantially transparent to the processor 102. Information is not lost if one memory of the redundant array of independent memories fails, and system operation continues while the failed memory is being replaced because configuration communications are intercepted and blocked at the controller 104. When compared with the storage efficiency of memory mirroring, a redundant array of independent memories provides improved storage efficiency.

The apparatus 100, shown in FIG. 1, shows an embodiment including one processor 102, one controller 104, one expander memory bridge location 106, and one memory 108. Those skilled in the art will appreciate that other embodiments can be formed that include one or more processors 102, one or more controllers 104, one or more expander memory bridge locations 106, and one or more memories 108, such as the embodiment shown in FIG. 2.

Figure 2:
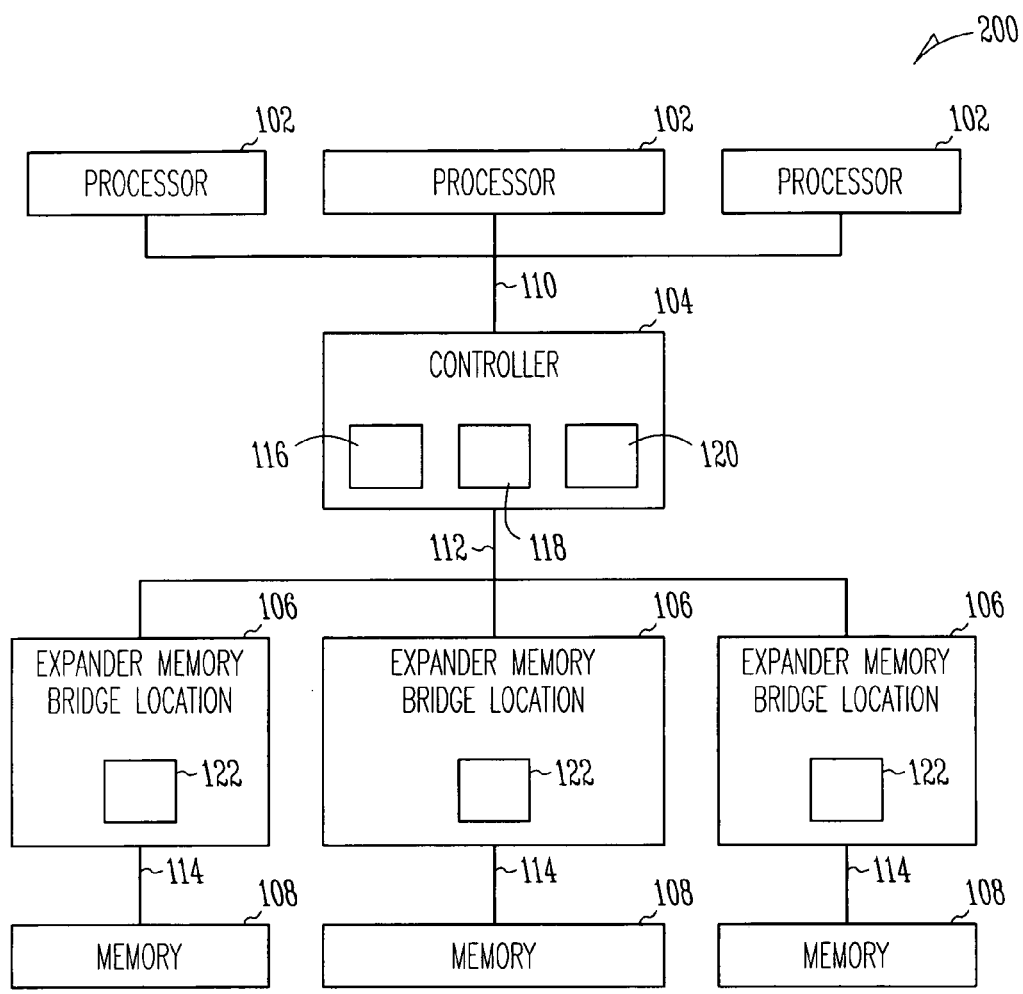
FIG. 2 is a block diagram of an apparatus including processors, a controller, expander memory bridge locations, and memories in accordance with some embodiments of the present invention.

FIG. 2 is a block diagram of an apparatus 200 including processors 102, the controller 104, expander memory bridge locations 106, and memories 108 in accordance with some embodiments of the present invention. The processors 102 are coupled to the controller 104 through the signal path 110. The signal path 110 provides a communication channel between the processors 102 and the controller 104. The controller 104 includes the intercept logic 116, the expander memory bridge plugged-in bit 118, and the disable intercept logic bit 120. The controller 104 is coupled to the expander memory bridge locations 106 through the signal path 112. The signal path 112 provides a communication channel between the controller 104 and the expander memory bridge locations 106. The expander memory bridge locations 106 are coupled to the memories 108 through the signal paths 114. Each of the expander memory bridge locations 106 can include the expander memory bridge 122. Each of the signal paths 114 provide a communication channel between one of the expander memory bridge locations 106 and one of the memories 108. Thus, the apparatus 200 provides each of the processors 102 with access to information stored in each of the memories 108.

Figure 3:
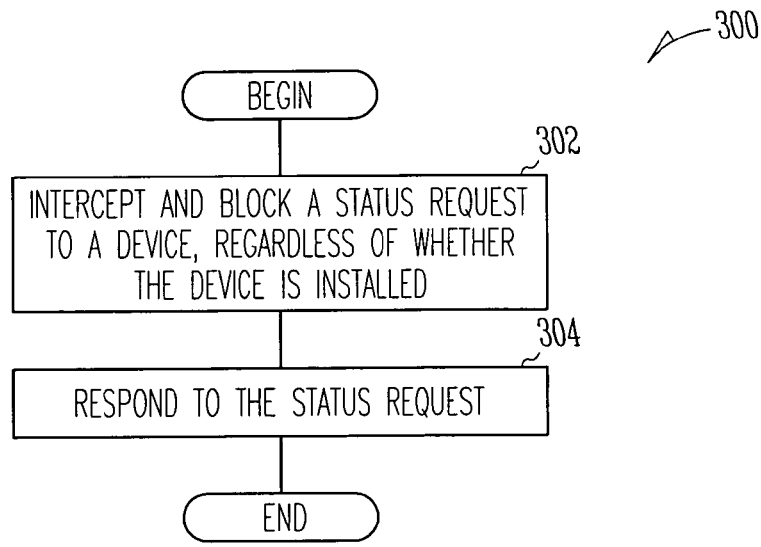
FIG. 3 is a flow diagram of a method of emulating a device, such as the expander memory, shown in FIG. 1, in accordance with some embodiments of the present invention.

FIG. 3 is a flow diagram of a method 300 of emulating a device, such as the expander memory 122, shown in FIG. 1, in accordance with some embodiments of the present invention. The method 300 includes intercepting and blocking a status request to a device, regardless of whether the device is installed (block 302), and responding to the status request (block 304). A status request includes a communication to configuration space. In some embodiments, intercepting and blocking the status request to the device, regardless of whether the device is installed, includes intercepting and blocking the status request during a configuration access to the device. In some embodiments, responding to the status request includes emulating a response the device returns when the status request is not blocked. In some embodiments, emulating a response the device returns when the status request is not blocked includes emulating the response of a memory bridge. In some embodiments, responding to the status request includes responding that the device is available when the device is not installed. In some embodiments, responding to the status request includes responding to the status request in a time period substantially equivalent to the time period in which a non-intercepted status request is responded to. In some embodiments, intercepting and blocking the status request to the device, regardless of whether the device is installed, includes intercepting the status request directed to configuration space. In some embodiments, the method 300 further includes removing the device, if the device is installed. In some embodiments, removing the device, if the device is installed, includes removing a memory device.

In some embodiments, the method 300 further includes adding the device, if the device is not installed. In some embodiments, adding the device if the device is not installed, includes adding a double data rate memory device.

Figure 4:
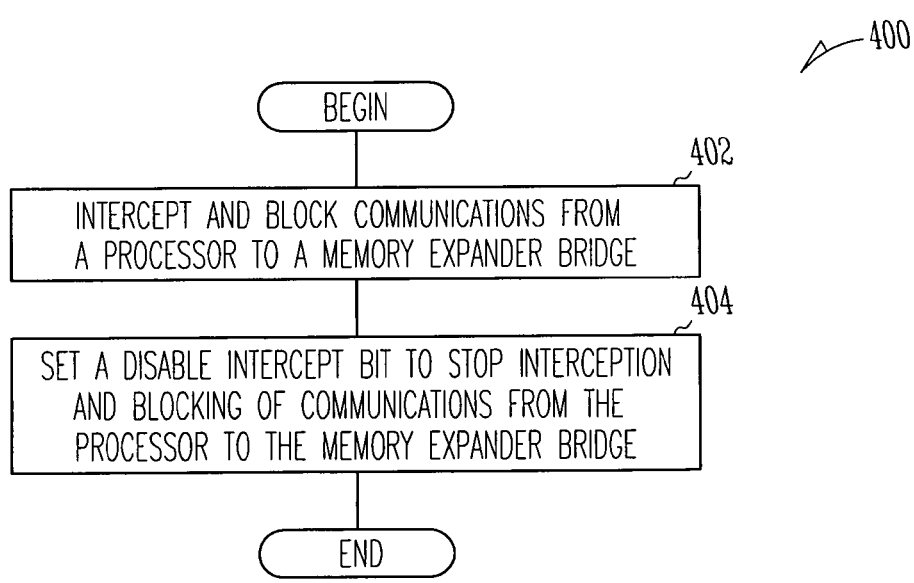
FIG. 4 is a flow diagram of a method of using the disable intercept bit, shown in FIG. 1, to indicate that device emulation, shown in FIG. 3, is not active in accordance with some embodiments of the present invention.

FIG. 4 is a flow diagram of a method 400 of using the disable intercept bit 120, shown in FIG. 1, to indicate that device emulation, shown in FIG. 3, is not active in accordance with some embodiments of the present invention. The method 400 includes intercepting and blocking communications from a processor to an expander memory bridge (402), and setting a disable intercept bit to stop interception and blocking of communications from the processor to the expander memory bridge (404). In some embodiments, the method 400 further includes configuring the expander memory bridge. In some embodiments, configuring the expander memory bridge includes writing information to the expander memory bridge. In some embodiments, the method 400 further includes resetting the disable intercept bit.

Figure 5:
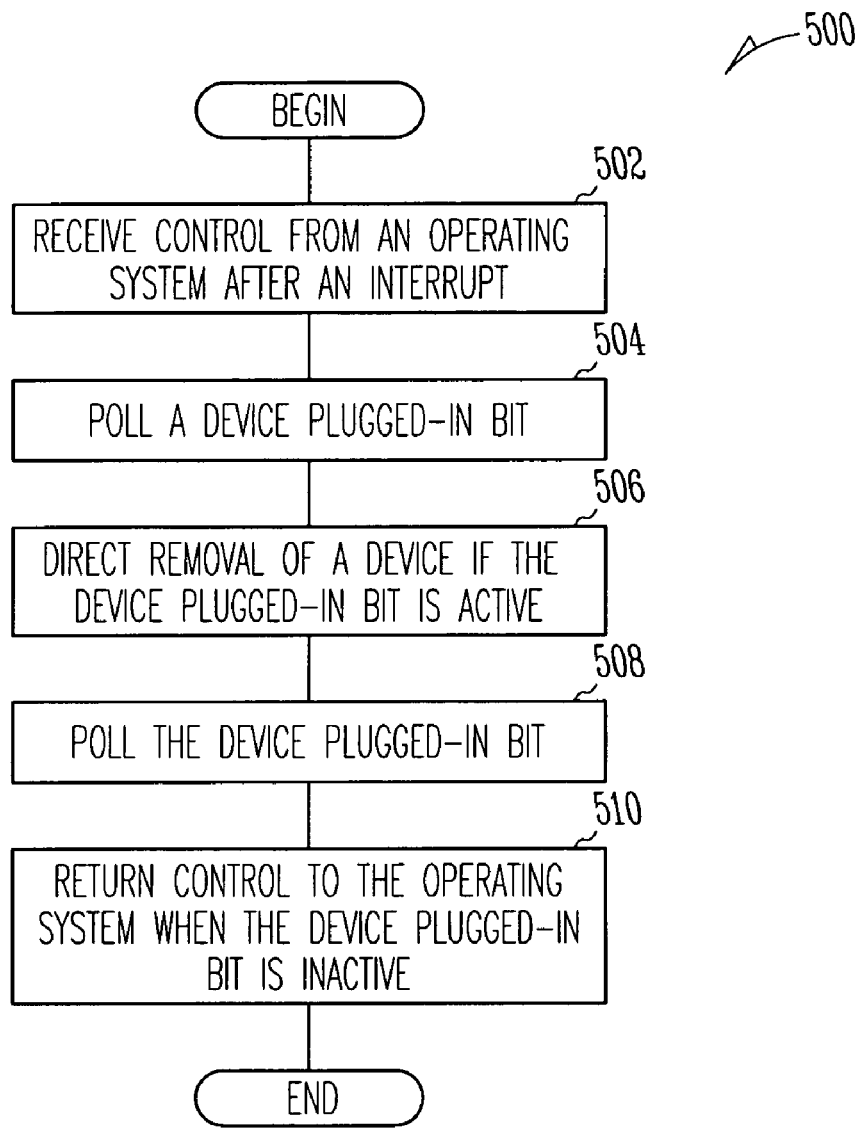
FIG. 5 is a flow diagram of a method of using a device plugged-in bit, such as the expander memory bridge plugged-in bit, in the apparatus, shown in FIG. 1, to facilitate removal of the expander memory bridge, shown in FIG. 1, without shutting down the apparatus in accordance with some embodiments of the present invention.

FIG. 5 is a flow diagram of a method 500 of using a device plugged-in bit, such as the expander memory bridge plugged-in bit 118, in the apparatus 100, shown in FIG. 1, to facilitate removal of the expander memory bridge 122, shown in FIG. 1, without shutting down the apparatus 100 in accordance with some embodiments of the present invention. The method 500 includes receiving control from an operating system after an interrupt (block 502), polling a device plugged-in bit (block 504), directing removal of a device, if the device plugged-in bit is active (block 506), polling the device plugged-in bit (block 508), and returning control to the operating system when the device plugged-in bit is inactive (block 510). In some embodiments, directing removal of the device, if the device plugged-in bit is active, includes directing removal of an expander memory module. In some embodiments, polling the device plugged-in bit includes polling a controller that provides the device plugged-in bit.

Figure 6:
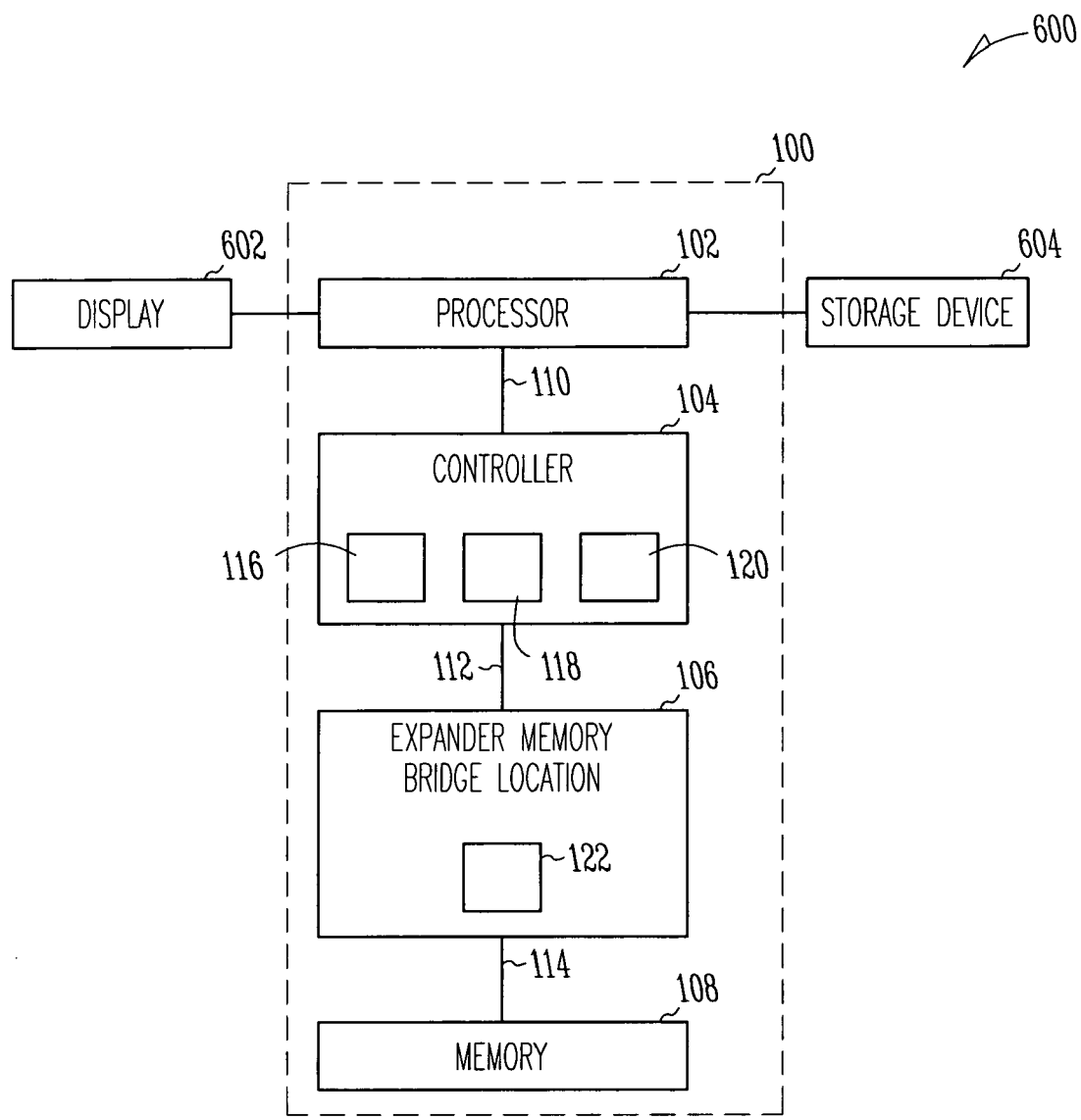
FIG. 6 is a block diagram of a system including the apparatus, shown in FIG. 1, coupled to a display and a storage device in accordance with some embodiments of the present invention.

FIG. 6 is a block diagram of a system 600 including the apparatus 100, shown in FIG. 1, coupled to a display 602 and a storage device 604 in accordance with some embodiments of the present invention. The apparatus 100 includes the processor 102, the controller 104, the expander memory bridge location 106, and the memory 108, as shown in FIG. 1 and described above. The controller 104 includes the intercept logic 116, the expander memory bridge plugged-in bit 118, and the disable intercept logic bit 120, as shown in FIG. 1 and described above. The expander memory bridge location 106 provides a location for connecting, coupling, or installing the expander memory bridge 122, as shown in FIG. 1 and described above.

The display 602 provides an apparatus for displaying information, such as text, static images, or video. The display 602 is not limited to a particular type of display. Exemplary display suitable for use in connection with the system 600 include cathode ray tubes, plasma displays, and thin film displays.

The storage device 604 provides an apparatus for storing information, such as digital information, including text data and image data. The storage device 604 is not limited to a particular type of storage device. Exemplary storage devices suitable for use in connection with the system 600 include magnetic storage devices, such as disk drives, optical storage devices, such as digital-video-disks and compact disks.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although specific embodiments have been described and illustrated herein, it will be appreciated by those skilled in the art, having the benefit of the present disclosure, that any arrangement which is intended to achieve the same purpose may be substituted for a specific embodiment shown. This application is intended to cover any adaptations or variations of the present invention. Therefore, it is intended that this invention be limited only by the claims and the equivalents thereof.

What is claimed is:

1. An apparatus comprising:
   a processor;
   an expander memory bridge location, the expander memory bridge location including a location to couple to and allow installation of an expander memory bridge;
   a memory coupled to the expander memory bridge location; and
   a controller coupling the processor to the expander memory bridge location, the controller including intercept logic to intercept and block communication from the processor to the expander memory bridge location and to emulate an expander memory bridge including responding to the processor regardless of whether the expander memory bridge is or is not installed at the location.

2. The apparatus of claim 1, wherein the controller includes a disable intercept logic bit.

3. The apparatus of claim 1, wherein the bus controller includes an expander memory bridge plugged-in bit.

4. The apparatus of claim 1, further comprising an operating system to operate in cooperation with the processor, the operating system free of support for hot-pluggable components.

5. The apparatus of claim 2, wherein the memory includes a mirror configuration.

6. The apparatus of claim 2, wherein the memory includes a redundant array of independent memories.

7. The apparatus of claim 5, wherein the processor includes a complex instruction set processor.

8. The apparatus of claim 3, wherein the memory includes a double data rate memory.

9. A method comprising:
   intercepting and blocking a status request to a device, regardless of whether the device is installed, wherein intercepting and blocking the status request to the device, regardless of whether the device is installed, includes intercepting and blocking the status request during a configuration access to the device; and
   responding to the status request.

10. The method of claim 9, wherein responding to the status request includes emulating a response the device returns when the status request is not blocked.

11. The method of claim 10, wherein emulating a response the device returns when the status request is not blocked includes emulating the response of a memory bridge.

12. A method comprising:
    intercepting and blocking a status request to a device, regardless of whether the device is installed; and
    responding to the status request, wherein responding to the status request includes responding that the device is available when the device is not installed.

13. The method of claim 12, wherein responding to the status request includes responding to the status request in a time period substantially equivalent to the time period in which a non-intercepted status request is responded to.

14. The method of claim 13, wherein intercepting and blocking the status request to the device, regardless of whether the device is installed, includes intercepting the status request directed to configuration space.

15. The method of claim 12, further comprising, removing the device, if the device is installed.

16. The method of claim 15, wherein removing the device, if the device is installed, includes removing a memory device.

17. The method of claim 12, further comprising, adding the device, if the device is not installed.

18. The method of claim 17, wherein adding the device if the device is not installed, includes adding a double data rate memory device.

19. A method comprising:
    intercepting and blocking communications from a processor to an expander memory bridge;
    emulating the expander memory bridge including responding to the processor regardless of whether the expander memory bridge is or is not installed at the location; and
    setting a disable intercept bit to stop interception and blocking of communications from the processor to the expander memory bridge.

20. The method of claim 19, further comprising configuring the expander memory bridge.

21. The method of claim 20, further comprising resetting the disable intercept bit.

22. A system comprising:
    a processor;
    an expander memory bridge location;
    a memory coupled to the expander memory bridge location;
    a controller including intercept logic to intercept and block communication from the processor to the expander memory bridge location and to emulate an expander memory bridge including responding to the processor regardless of whether the expander memory bridge is or is not installed at the location;
    a display coupled to the processor; and
    a storage device coupled to the processor.

23. The system of claim 22, wherein the display comprises a plasma display.

24. The system of claim 22, wherein the storage device comprises a magnetic storage device.

* * * * *